US007003610B2

(12) United States Patent
Yang et al.

(10) Patent No.: US 7,003,610 B2
(45) Date of Patent: Feb. 21, 2006

(54) SYSTEM AND METHOD FOR HANDLING SHARED RESOURCE WRITES ARRIVING VIA NON-MASKABLE INTERRUPTS (NMI) IN SINGLE THREAD NON-MISSION CRITICAL SYSTEMS WITH LIMITED MEMORY SPACE

(75) Inventors: Jinchao Yang, Wichita, KS (US); Jason Owens, Wichita, KS (US); Lance Lesslie, Wichita, KS (US)

(73) Assignee: LSI Logic Corporation, Milpitas, CA (US)

( * ) Notice: Subject to any disclaimer, the term of this patent is extended or adjusted under 35 U.S.C. 154(b) by 616 days.

(21) Appl. No.: 10/251,344

(22) Filed: Sep. 20, 2002

(65) Prior Publication Data

US 2004/0059855 A1 Mar. 25, 2004

(51) Int. Cl.
*G06F 13/14* (2006.01)
*G06F 9/46* (2006.01)
(52) U.S. Cl. ...................................... 710/260; 718/102
(58) Field of Classification Search ................ 710/260, 710/263, 264; 718/100–105
See application file for complete search history.

(56) References Cited

U.S. PATENT DOCUMENTS

| 5,835,763 | A  | * | 11/1998 | Klein ........................... 718/101 |
| 6,260,125 | B1 | * | 7/2001 | McDowell .................. 711/162 |
| 6,789,147 | B1 | * | 9/2004 | Kessler et al. .............. 710/200 |
| 2002/0073082 | A1 | * | 6/2002 | Duvillier et al. .............. 707/3 |
| 2003/0177164 | A1 | * | 9/2003 | Savov et al. ................. 709/104 |
| 2003/0200253 | A1 | * | 10/2003 | Cheung et al. ............. 709/107 |

OTHER PUBLICATIONS

"Preliminary comparison between the single-threaded and multi-threaded RHODOS microkernel", Networks, 1995, published Jul. 3-7, 1995, pp. 503-507.*

* cited by examiner

*Primary Examiner*—Rehana Perveen
*Assistant Examiner*—Trisha Vu
(74) *Attorney, Agent, or Firm*—Suiter West Swantz PC LLO (57) ABSTRACT

A system and method for handling shared resource writes arriving via non-maskable interrupts in single thread non-mission critical system with limited memory space includes a queue for providing temporary storage of a write request. The queue is accessible by lower or higher priority processes for the servicing of the write requests. Upon completion of service to the write requests the system returns control to the standard operations of the single thread system.

33 Claims, 7 Drawing Sheets

SYSTEM AND METHOD FOR HANDLING SHARED RESOURCE WRITES ARRIVING VIA NON-MASKABLE INTERRUPTS (NMI) IN SINGLE THREAD NON-MISSION CRITICAL SYSTEMS WITH LIMITED MEMORY SPACE

FIELD OF THE INVENTION

The present invention generally relates to the field of software application in embedded devices, and particularly to a system and method for handling shared resource writes arriving via non-maskable interrupts in single thread non-mission critical systems with limited memory space.

BACKGROUND OF THE INVENTION

In software development it is important to guarantee the integrity of shared resources. In a multi-thread/process system integrity of shared resources is generally maintained by using variables such as flags and/or semaphores to control resource accesses (read/write) by different processes. The processes typically fall into two groups: 1) Polling or Idle processes and 2) Interrupt processes. The polling or idle processes update the system periodically and are usually scheduled by a round robin algorithm. The interrupt processes handle interrupt requests generated externally (e.g., the user) or internally (e.g., by the system when detecting some type of fault or failure). The variables effectively disable the services to the interrupt requests so that simultaneous accesses (especially writes) to the shared resources by different processes or threads are prohibited.

Processes may be associated with different priorities, so higher priority mission-critical tasks are serviced before lower priority tasks (via a context switch). Under this condition, the global/local variables of an unfinished (lower priority) process will be pushed on the stack, and those of a new (higher priority) process will be fetched and pushed on top of those of the old (lower priority) process. Only after the higher priority process finishes execution and returns control to the old process, may the old process resume its execution by another context switch. The higher priority process is called the interrupt service routine (ISR) since generally higher priority processes take over the control as interrupts. The typical result is that under conditions that interrupts are not desired when shared resource access is in progress, the interrupts are normally ignored (masked) until the shared (critical) information access has been finished.

In some single thread systems, the system or externally generated interrupts should not be masked due to the fact that some of the interrupt requests are one-shot activities (e.g., intermittent failure log). If any of the requests are ignored, the same interrupt requests may not be generated any more, therefore these requests will be lost forever, and the system may behave improperly. In single thread/process systems with limited memory space, where no interrupts may be ignored, it has been impossible to guarantee the integrity of these shared resources when being accessed by normal priority routines and interrupt routines. This is illustrated by two examples.

Case A (modification to different bits) with Xi, Yi, Zi=0,1. The polling process (normal or lower priority process) and interrupt process (higher priority process) each modify a different bit within the shared resource. The interrupt process executes its write operation after the polling process executes its read operation but before the polling process executes its write operation.

---

Shared Resource: VAR;
Bit-wise variable names: VAR0, VAR1, VAR2, VAR3, VAR4, VAR5, VAR6, VAR7 for corresponding bits;
Variable memory address: ADDR_SR;
Byte information: value X0, X1, X2, X3, X4, X5, X6, X7 for bits VAR0 to VAR7.
Polling (idle) process: read VAR into register R1 from ADDR_SR, modify bit-4 from X4 to Y4, so the register R1 has the information X0X1X2X3Y4X5X6X7;
Interrupt process: (before the above polling process commits the write operation), uses register R2 to hold the value of VAR, set the VAR3 value to Z3. Write the value Z3 in R2 to memory address ADDR_SR. Now the value at ADDR_SR is possibly X0X1X2Z3X4X5X6X7 due to the fact that the smallest addressable unit of a write is eight bits (one byte).
Polling process: write the value in R1 back into memory address ADDR_SR, so that the final value becomes X0X1X2X3Y4X5X6X7, whereas the expected value should be X0X1X2Z3Y4X5X6X7.

---

Case B (modification to same control bit) with Xi, Yi, Zi=0,1. The polling process and interrupt process each modify the same bit within the shared resource. The interrupt process executes its write operation after the polling process read operation but before the polling process executes its write operation.

---

Shared resource: VAR;
Bit-wise variable names: VAR0, VAR1, VAR2, VAR3, VAR4, VAR5, VAR6, VAR7 for corresponding bits;
Variable memory address: ADDR_SR;
Byte information: value X101X2X3X4X5X6X7 for bits VAR0 to VAR7.
Polling process: read VAR into register R1 from ADDR_SR, flip bit-4 from X4 to (~X4), so the register R1 has the information X0X1X2X3(~X4)X5X6X7,
where Xi and ~Xi has the following relationship:
    Xi = 0 ⇒ ~Xi = 1
    Xi = 1 ⇒ ~Xi = 0
Interrupt process: use register R2 to hold the value of VAR, set the VAR4 value to Z4 (Z4 may be equal to X4 or ~X4). Write the value Z4 in R2 to memory address ADDR_SR. Now the value at ADDR_SR is possibly X0X1X2Z3Z4X5X6X7 due to the fact that the smallest addressable unit of a write is eight bits (one byte).
Polling process: write the value in R1 back into memory address ADDR_SR, so that the final value becomes X0X1X2X3(~X4)X5X6X7 whereas the expected value should be X0X1X2X3Z4X5X6X7. If Z4 equals ~X4, then X0X1X2X3(~X4)X5X6X7 and X0X1X2X3Z4X5X6X7 are equal, however, since Z4 can be either X4 or ~X4, there is a fifty percent chance that the wrong result is achieved.

---

In systems with large amounts of memory and central processing unit (CPU) power, typically multi-thread systems (discussed previously), the common practice is to disable services for interrupt requests so that simultaneous accesses to the shared information (either the same bit or different bit in the same control byte) is prohibited. That is, while modification of the shared resource by the polling task is in progress, interrupts will be ignored until the access privilege is released by the polling task, which does so once it finishes its operation on the shared resource. This ensures the integrity of the shared resource, but is only functional if interrupts are disabled very briefly, since any interrupt blockage introduces the possibility of losing a time-sensitive notification. Such an assumption is safe in larger, multi-threaded systems with more memory and CPU power.

In the two above cases involving a single thread non-mission-critical system, if the interrupt process attempts to modify the same bit, or any other bit(s) in the same byte (as the smallest addressable unit) of the shared information, incorrect results will be obtained. Multi-bit or multi-byte writes may cause even more serious problems. The need to modify bits within an individual byte is typical of systems with limited memory space. Therefore, in single thread non-mission-critical systems with limited memory space, a method of handling all interrupt requests while maintaining the integrity of the shared resources has not been achieved.

Therefore, it would be desirable to provide a system and method for servicing all write requests received via interrupts in single thread non-mission-critical systems with limited memory space and avoiding shared resource conflicts.

SUMMARY OF THE INVENTION

Accordingly, the present invention is directed to a system and method for handling write requests arriving via non-maskable interrupts (NMI) in single thread non-mission-critical systems with limited memory space without disturbing the integrity of the shared resources and servicing the write requests as quickly as possible.

In a first aspect of the present invention, a method is disclosed for handling write requests in a manner which services the write request and does not disrupt the integrity of shared resources or mask the interrupt request. The write requests are registered and temporarily stored on a write request storage location. The write requests are stored as storage elements and the registration of the write requests occurs before any service routines are performed on the write requests. The storage elements describe the type of write request and the corresponding parameters. The write requests are held in storage until it is verified that the shared resource variable it is attempting to access is not currently being accessed and then the write request is accessed from the storage location and serviced. Using the write request storage location permits interrupts to run without being disabled, eliminating the possibility of losing a time-sensitive notification.

In another aspect of the present invention, a system, disposed within a single thread system, includes a write request queue upon which write requests, received via interrupt requests, are registered and temporarily stored. The single thread system is able to avoid masking the interrupts by temporarily storing the write requests on the queue before the write requests are serviced. Servicing of the write requests, in this aspect, is accomplished by a polling process, which services all registered write requests on the write request queue.

In another aspect of the present invention, a system, disposed within a single thread system, includes a write request queue, an interrupt handler and a polling process. In this system the servicing of the write requests that are registered on the queue may be accomplished by either the polling process or the interrupt handler, which controls the execution of interrupt processes. This dual servicing capability decreases the service time for each individual write request as well as ensuring that no write request is ignored and that shared resource access conflicts are avoided.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Figure 1:
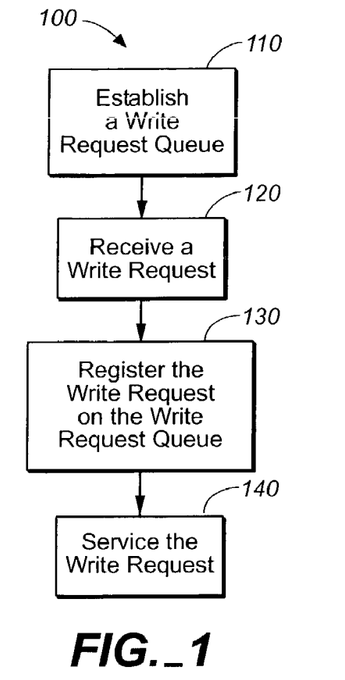
FIG. 1 is an illustration of a method for handling a write request within a single thread system in accordance with an exemplary embodiment of the present invention.

Referring generally now to FIG. 1 a method 100 for the handling of a write request (interrupt request) within a single thread system is shown. Step 110 creates a queue within the single thread system. The queue, in this algorithm, is included in software installed on a single thread system. In application, the queue is a temporary storage location and servicing platform for write requests.

The queue is a global limited size queue with each queue element describing the type of write request and the corresponding parameter. The maximum capacity of write requests registered on the queue is represented by the variable (QUE_LEN). Two variables are used to indicate the start (START_INDX) and end (END_INDX) indices of the queue. Additionally, two other variables are used to monitor the write request count (REQ_CNT) and write service count (SER_CNT).

It is contemplated that the algorithm which established the queue may alternately, be designed to establish a linked list. The linked list minimizes memory utilization by eliminating the need of establishing and maintaining a fixed size queue. Thus, when the linked list is empty there are only two applications, a head node and a tail node, that require continued memory support. Write requests are inserted between the head and tail. Each write request forms an individual node which is removable from the linked list in order to be serviced. While structurally unique, the queue and the linked list are functionally equivalent.

Step 120 identifies to the single thread system, via an interrupt request, that a write request has arrived. Through the use of a keyboard, mouse or other operator controlled functions an operator may generate an external interrupt. Alternately, interrupt requests may be generated internally, where the system itself generates writes to be executed.

Whether externally or internally generated the write request is received, initially as an interrupt request, by an interrupt handler.

The interrupt handler in step 130 takes the received write request and registers the write request on the queue. When write requests arrive they are registered on the queue between the start and end indices. The end index (END_INDX) and the request count variable (REQ_CNT) are incremented to reflect the addition of the newly arrived interrupt request.

In step 140 the write request that has been registered on the queue is serviced. Servicing involves the initiation of a write-handler routine. The write-handler routine performs two functions. First, the write-handler routine accesses the write request from the queue. Second, it executes the write request command(s) upon the system. The start index (START_INDX) and the service count (SERV_CNT) are incremented to reflect the servicing process. The write-handler routine may be initiated through a variety of operational processes working individually or in coordinated function.

Figure 2:
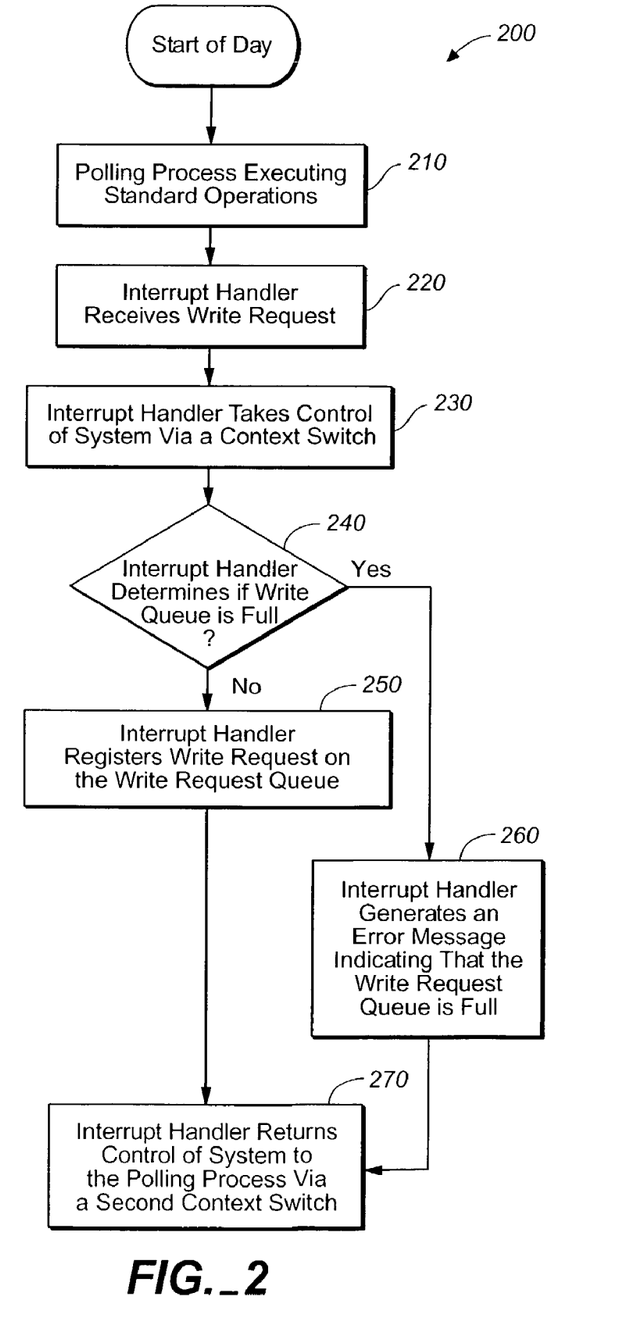
FIG. 2 is an illustration of a method for receiving and registering the write requests on a write queue.

FIG. 2 illustrates the steps involved in the receiving and registering of the write request upon the queue. Generally designated by reference numeral 200 the method begins at step 210 where the single thread system is running its normal priority process or polling process. This polling process is a lower priority process than an interrupt process, which is typically designated as a higher priority process. The interrupt process is executed by the interrupt handler whenever an interrupt request is received by the interrupt handler. In step 220 the interrupt handler receives the write request. Whether generated internally or externally, this interrupt is treated the same and is given the same higher priority status. When, in step 230, this higher priority command is received the interrupt handler takes control of the single thread system utilizing a first context switch.

By utilizing the context switch the interrupt handler takes over the single thread system, halting the execution of the polling process (lower priority) and beginning the execution of the interrupt process. Execution of the interrupt process by the interrupt handler begins in step 240 with the checking of the write request queue in order to determine if it is full. The write request queue is full when the request count (REQ_CNT) minus the service count (SER_CNT) is greater than or equal to the queue maximum capacity (QUE_LEN) or stated another way the queue is full when REQ_CNT−SER_CNT >=QUE_LEN.

Upon the interrupt handler determining that the queue is not full, in step 250, the interrupt handler registers the write request on the queue, increments the REQ_CNT and the END_INDX and if the END_INDX is equal to the QUE_LEN, it is cleared to zero. Alternately, upon the interrupt handler determining that the queue is full, in step 260, the interrupt handler generates an error message to indicate that the write request queue is full.

Completion of steps 250 and 260 place the system in a state where either the write request is registered or the write request is not registered and an error message has identified this to the operator of the system. In either case the interrupt handler has executed its mission and the control the interrupt handler has over the system is returned to the polling process. The interrupt handler, in step 270, returns control of the system to the polling process by utilizing a second context switch. The system returns to running its normal/lower priority polling process.

Figure 3:
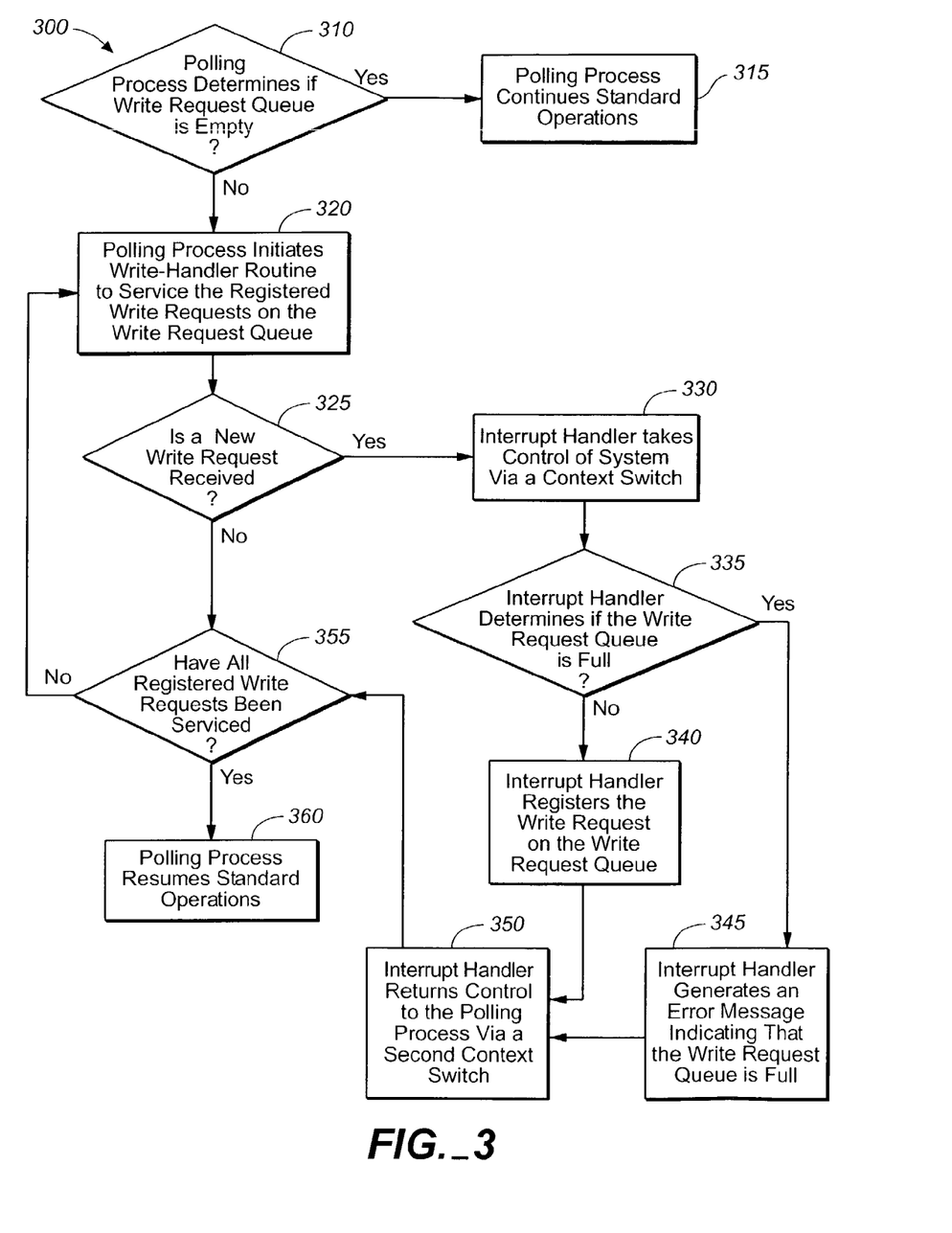
FIG. 3 is an illustration of a first method for servicing of the write request registered on the write queue by a polling process.

Referring to FIG. 3, a method 300 for servicing write requests registered on the write request queue is shown. As discussed in FIG. 2, upon completion of the registration of the write request on the queue, control over the single thread system is returned to the polling process. At the beginning of each polling process, the polling process determines if the queue is empty. Thus, in step 310 the polling process is checking the queue for write requests registered on the queue. If the polling process determines that the queue is empty then in step 315 the polling process executes the standard read/write operations within its programming. If the polling process determines that the queue is not empty and write requests are present, in step 320, the polling process initiates the write-handler routine and begins servicing the write request(s) on the queue. The start index (START_INDX) and the service count (SER_CNT) are incremented as the polling process services the individual write request(s) on the queue.

As the polling process continues servicing the write request(s) on the queue, the interrupt handler, in step 325, is keeping track of any new write requests (interrupts) being received. If no new write requests arrive in step 325, then the polling process, which is executing the write-handler routine, progresses from step 320 through step 325 to step 355. In step 355 the polling process determines if all registered write requests have been serviced. If registered write requests are still present on the write request queue, then the polling process cycles back to step 320 and continues to service the remaining write requests. If the polling process in step 355 determines that all registered write requests have been serviced then in step 360 the polling process resumes its standard operations. However, if during the execution of the write-handler routine by the polling process the interrupt handler in step 325 receives a new write request, the servicing method takes an alternate course.

With the arrival of a new write request (interrupt) during servicing of registered write request(s) by the polling process, the interrupt handler, in step 330, utilizes a context switch to take control over the system in order to register the write request. Once control has been given to the interrupt handler, in step 335, the interrupt process determines if the queue has reached its maximum capacity. This determination is similar to the determination made in step 240 of FIG. 2. If the interrupt process determines that the queue is full then the interrupt process, in step 345, generates an error message which indicates to an operator that the queue is full. This error message for a full queue is similar to that generated in step 260 of FIG. 2. If the interrupt process determines that the queue is not full then in step 340 the write request is registered on the write request queue and the variables are incremented as discussed in FIG. 2. Upon completion of steps 340 and 345 the interrupt handler, in step 350, utilizes a second context switch that returns control of the system to the polling process.

Once the polling process has regained control of the system the polling process, in step 355, determines if all registered write requests have been serviced. As discussed previously, if not all registered write requests have been serviced, then the polling process proceeds back to step 320 and initiates the write-handler routine. The servicing will continue until all write request(s) are serviced or another write request arrives. Once all registered write request(s) are serviced the polling process, in step 360, resumes execution of its standard operations.

Figure 4:
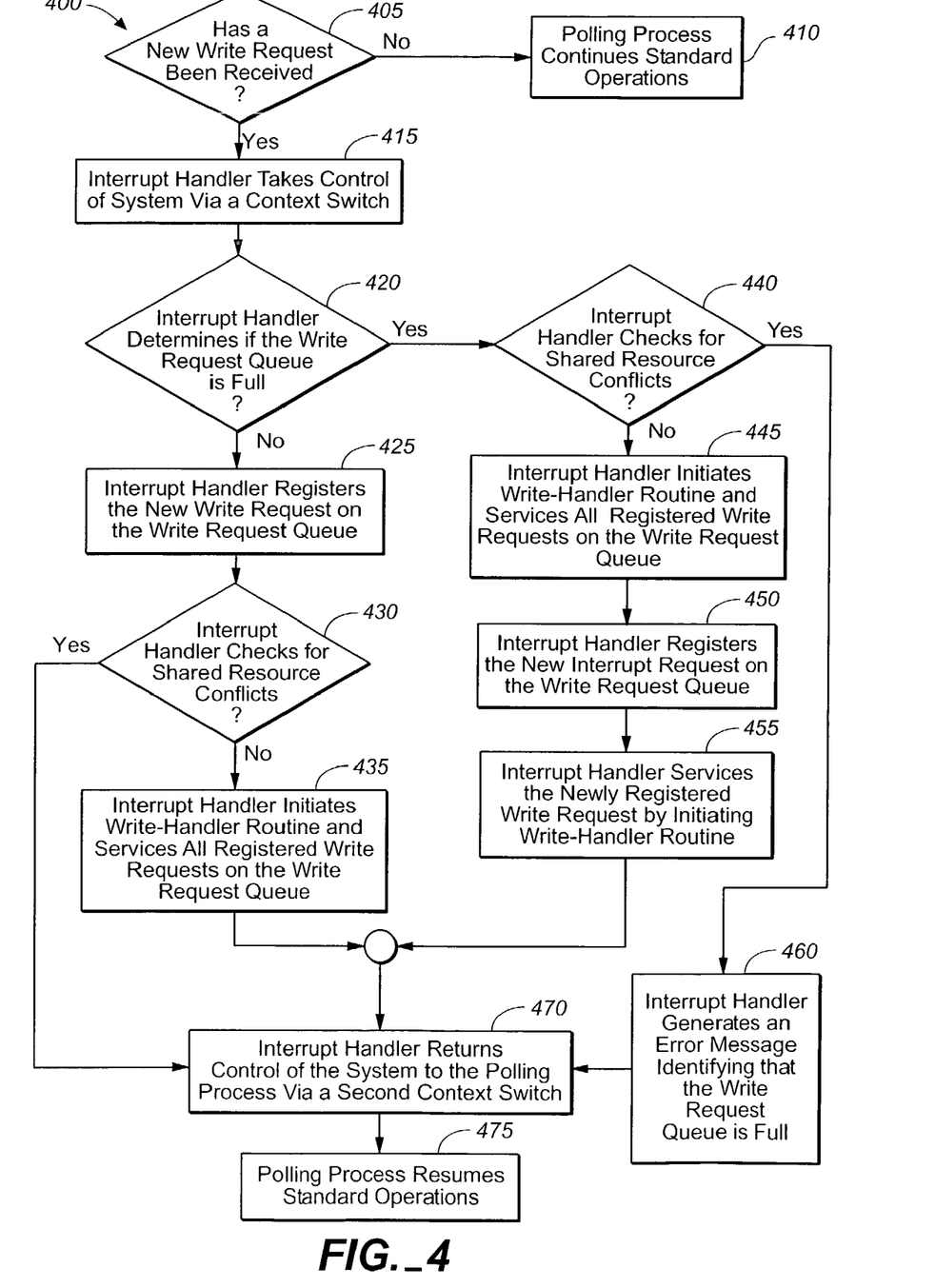
FIG. 4 is an illustration of a second method for servicing of the write request registered on the write queue by an interrupt handler process.

Referring now to FIG. 4 an alternate write request servicing method 400, for handling new write requests received during the servicing of registered write request(s) by the polling process as shown in FIG. 3, is shown. In step 405 the interrupt handler determines if a new write request has arrived. If no new write request is detected then in step 410 the polling process continues its normal priority operations. If step 405 detects a new write request arrival then the interrupt handler, in step 415, takes control of the system via a first context switch. The higher priority interrupt process, executed by the interrupt handler, in step 420, determines if the queue is full. This determination is similar to that of step 240 in FIG. 2 and step 335 in FIG. 3.

If the interrupt handler determines that the queue is not full, in step 425, the write request is registered on the write request queue and the appropriate variables are incremented as discussed above in FIG. 2. In step 430 the interrupt handler determines if there is any shared resource conflict between any modifications currently being implemented by the polling process and those to be made as a result of the write request. A shared resource conflict arises, for example, in a situation where the polling process is modifying a variable X (X is used for exemplary purposes only) and a write request is received which also tasks modification of the variable X. Such a situation presents a mutual exclusion problem which is in need of being resolved. If the determination is that there is no shared resource conflict, in step 435, the interrupt handler initiates a write-handler routine. As a result, the interrupt handler, executing the higher priority interrupt process, services all registered write request(s) on the queue. This provides service to the write request(s) as quickly as possible where no mutual exclusion problems exist. Upon servicing all registered write request(s) the method proceeds to step 470. In step 470, the interrupt handler, via a second context switch, returns control of the system to the lower priority polling process. Followed, in step 475, by the polling process resuming standard operations.

If step 430 determines that there is a shared resource conflict then, the write request stays registered on the queue. The method proceeds to steps 470 and 475, where the interrupt handler returns control to the lower priority polling process via a second context switch and the polling process resumes standard operations. With the write request registered it may be serviced by the polling process after all shared resource conflicts are no longer present.

In step 420, if the interrupt handler determines that the queue is full then the method proceeds to step 440. In step 440 the interrupt process determines if there is any shared resource conflict between the modification being implemented by the polling process and those to be made as a result of the write request, as discussed above. If in step 440 the interrupt handler determines that there is no shared resource conflict then the method proceeds to step 445. In step 445 the interrupt handler initiates the write-handler routine and services all of the registered write request(s) on the queue. Once all registered write request(s) have been serviced, in step 450, the interrupt handler registers the new write request on the queue. After registering the new write request the interrupt handler, in step 455, initiates the write-handler routine for the newly registered write request. Once all registered write request(s) have been serviced then the method proceeds to steps 470 and 475 where control over the system is returned to the polling process by the interrupt handler via the second context switch and the polling process resumes its standard operations.

In step 440, if the interrupt handler determines that there is a shared resource conflict then the method proceeds to step 460 and a queue full error message is generated similar to that generated in step 260 of FIG. 2 and step 345 of FIG. 3. The method then proceeds to steps 470 and 475 where the interrupt handler returns control to the lower priority polling process via the second context switch and the polling process resumes standard operations.

By servicing the write request(s) in both the polling processes and the interrupt process (executed by the interrupt handler), as described in FIG. 4 above, the required queue size decreases dramatically, and the waiting time of each write request (the time difference between when the request is generated and when it is serviced) is reduced.

The determination of shared resource conflicts by the interrupt handler is accomplished by defining and utilizing guide variables (flags and/or semaphores) around the shared resources whenever they are accessed in the polling routines. For example:

```
Assume shared resource variable: SR_RES;
Define guide variable: SR_RES_GUIDE;
When attempting to modify the SR_RES, do the following:
    SR_RES_GUIDEi = 1;      /*to access the shared resource
                              type i */
    SR_RES = NEW_SR_RES;   /*modifying the shared resource */
    SR_RES_GUIDEi = 0;      /*finishes shared resource modifi-
                              cation */
```

In this case, whenever a write request arrives in the middle of the above process (before the SR_RES_GUIDE is set to 0, meaning a non-committed write), the interrupt handler checks the value of the SR_RES_GUIDE to determine whether there is any outstanding shared resource modification in the polling processes. Additionally, whenever the polling processes are servicing the registered write request(s) from the queue, a similar set of guide variable may be used to protect the integrity of shared resources. Other routines for protecting shared resources, as contemplated by one of ordinary skill in the art may be employed without departing from the scope and spirit of the present invention.

Figure 5A:
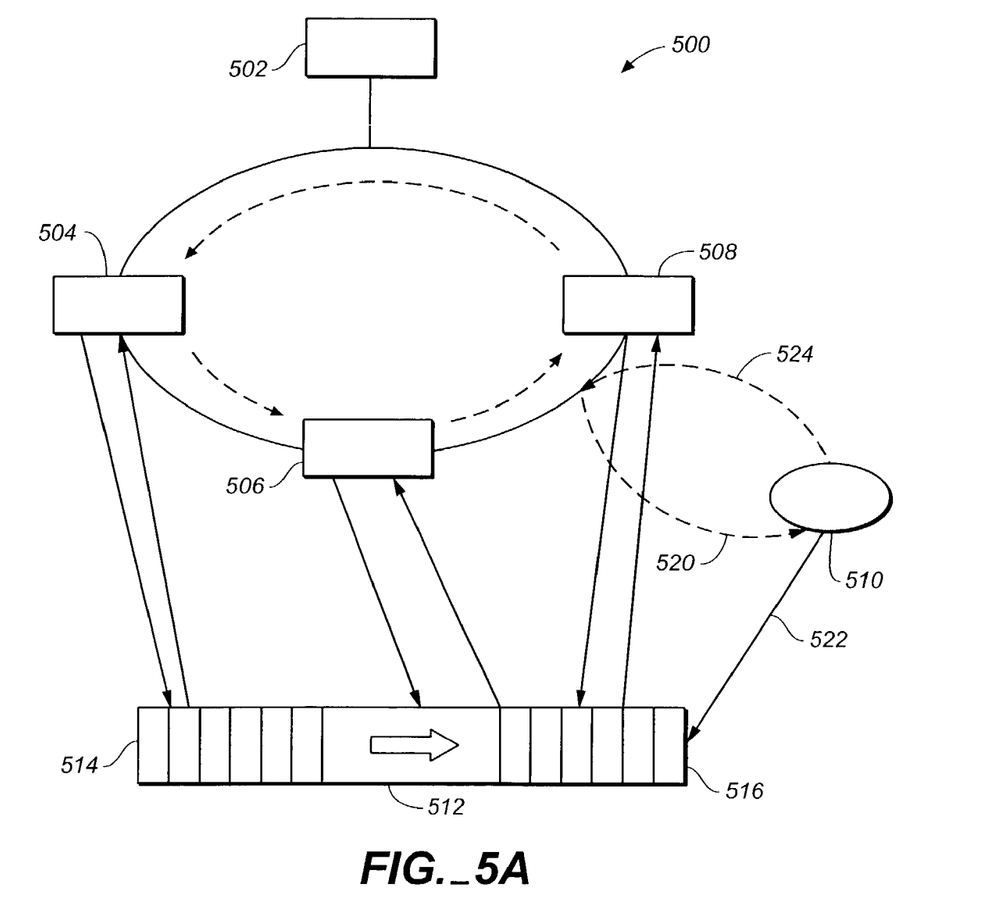
FIG. 5A is a diagrammatic representation of the interrupt handler process of the single thread system employing the first method for servicing write requests.
Figure 5B:
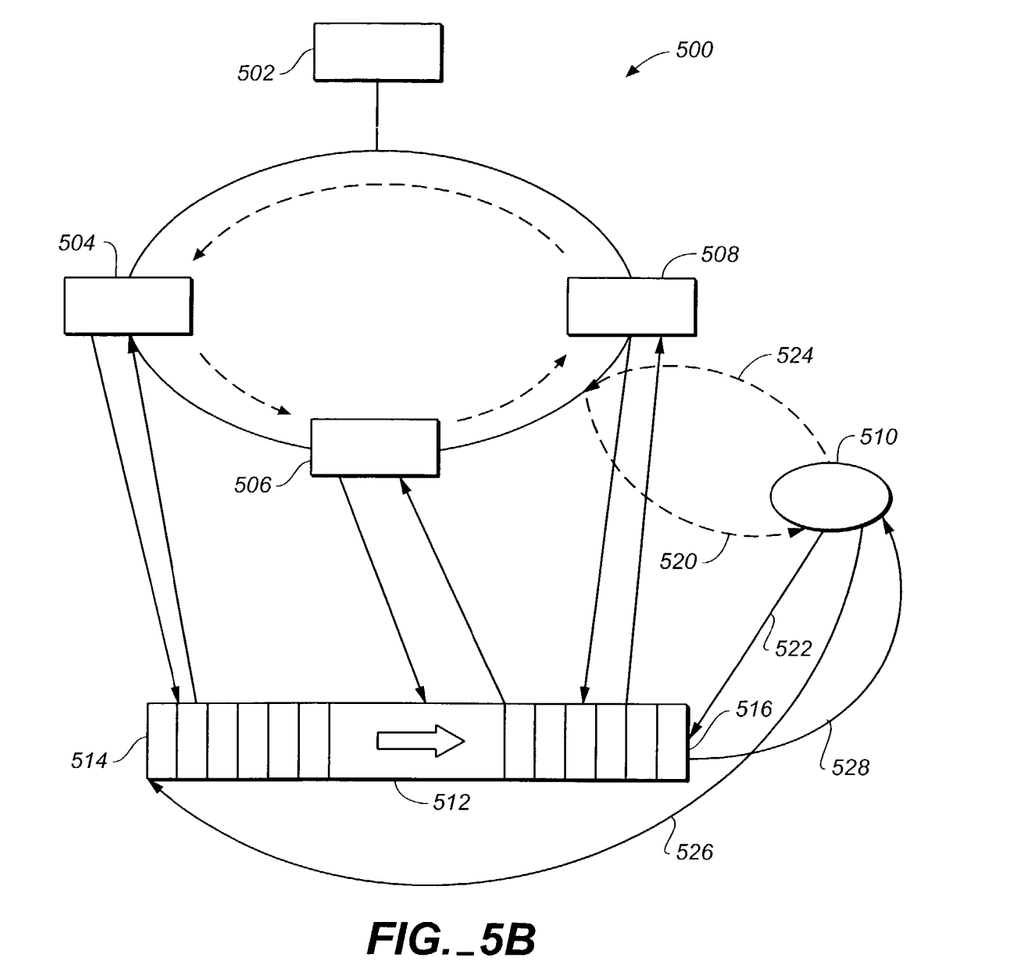
FIG. 5B is a diagrammatic representation of the interrupt handler process of the single thread system employing the second method for servicing write requests.

Referring now to FIGS. 5A and 5B, a diagrammatic representation of a single thread system 500 including the algorithm of the present invention is shown. The single thread system 500 includes a start of day 502 operation, a first polling process 504, a second polling process 506, and a third polling process 508. Additionally, the single thread system 500 includes an interrupt handler 510 and a write request queue 512. It is contemplated that the number and order of execution of the polling processes within the single thread system may vary from the present exemplary embodiment without departing from the scope and spirit of the present invention.

The algorithm of the present invention establishes the write request queue 512. The algorithm defines the interaction between the write request queue 512 and the interrupt handler 510 and the polling processes 504 through 508. In doing so the algorithm creates a method for maintaining and executing non-maskable interrupts as well as avoiding shared resource conflicts.

The write request queue 512 is a fixed size queue and maintains registered write requests as individual elements disposed on the queue. The diagram represents the write request queue 512 as a large rectangle with multiple partitions inside. Each partitioned smaller rectangle represents an individual registered write request. A first end 514 of the write request queue 512 is the queue head and a second end 516 is the queue tail. The write requests are placed in the order, starting from the first end 514, in which they were received from the interrupt handler 510.

The memory utilization requirements for the queue remain constant due to the fixed size of the queue, which means that even when the queue contains no registered write requests it still occupies memory space. As discussed previously in FIG. 1 with a limited size queue, once the number of registered write requests equals the total amount of available space, the queue is full and may be unable to accept any further writes. This condition results in the generation of an error message.

The alternate form of the queue, as mentioned previously, is a linked list. In the linked list, memory utilization is at a minimum when no registered write requests are present. In such an instance, the linked list is only required to maintain a head and a tail node, which do not require a large amount of memory space. As writes are registered they are individually identified between the head and a tail node and are ordered in the same manner as the queue.

In both FIGS. 5A and 5B the interrupt handler 510 interacts directly with the write request queue 512 and the polling processes 504 through 508. The interrupt handler executes the higher priority interrupt process. When the interrupt handler 510 receives an interrupt, comprising a write request, it takes control of the system via a context switch as indicated by dotted line 520. Once the interrupt handler 510 has control, it registers the write request on the queue as indicated by solid line 522. When other registered write requests are present on the queue, the newly registered write request is inserted at the next available position nearest the second end 516.

As shown in FIG. 5A after registering the write request, the interrupt handler 510 returns control back to the polling processes 504 through 508 via a second context switch as indicated by dotted line 524. The location indicated in the diagram for the interruption of the polling processes is exemplary and it is understood that the interrupt handler 510 may interrupt the polling processes at a variety of different points within the system.

As shown in FIG. 5B after registering the write request, the interrupt handler maintains control over the system. The interrupt handler runs a check to determine if there are any shared resource conflicts and begins servicing the write requests on the write request queue 512 if no resource access conflicts are found as indicated by solid line 526. The interrupt handler 510 proceeds to service all registered write requests on the queue as indicated by solid line 528. Once all registered write requests have been serviced the interrupt handler 510 returns control of the system back to the polling processes 504 through 508 via the second context switch as indicated by dotted line 524.

The polling processes 504 through 508 are the normal (lower) priority processes running by a round robin scheduling algorithm, in the order of 504 to 506 to 508 and then back to 504. The polling processes shown in the current diagram are exemplary and it is contemplated that any number of polling processes may be present within a representative single thread system as shown in FIGS. 5A and 5B. Therefore, polling process 504 may be P1, polling process 506 may be P2 and polling process 508 may be Pn, where n is any number of additional polling processes. In the execution of each polling process, the write request queue (or linked list) holding the write requests will be serviced (if not empty).

The servicing schedule is ordered on a first in, first out (FIFO) mechanism. Therefore, the polling process that initiates a write-handler routine will begin by servicing the write request registered on the queue nearest the first end 514 and subsequently work its way down the list until it reaches the second end 516 and no further write requests are present. If the write requests are registered on a linked list the same FIFO mechanism may be employed for servicing the write requests. Other mechanisms for servicing registered write requests on the write request queue or the linked list may be employed as contemplated by one of ordinary skill in the art.

In application the polling process servicing of the registered write requests is a normal (lower) priority process. Therefore, when the process diagrammed in FIG. 5B is employed to service the write requests the higher priority interrupt process will handle all servicing of the write requests when it is engaged. With the dual approach of FIG. 5B employed the write requests are handled as quickly as possible and any shared resource conflicts are avoided.

Figure 6:
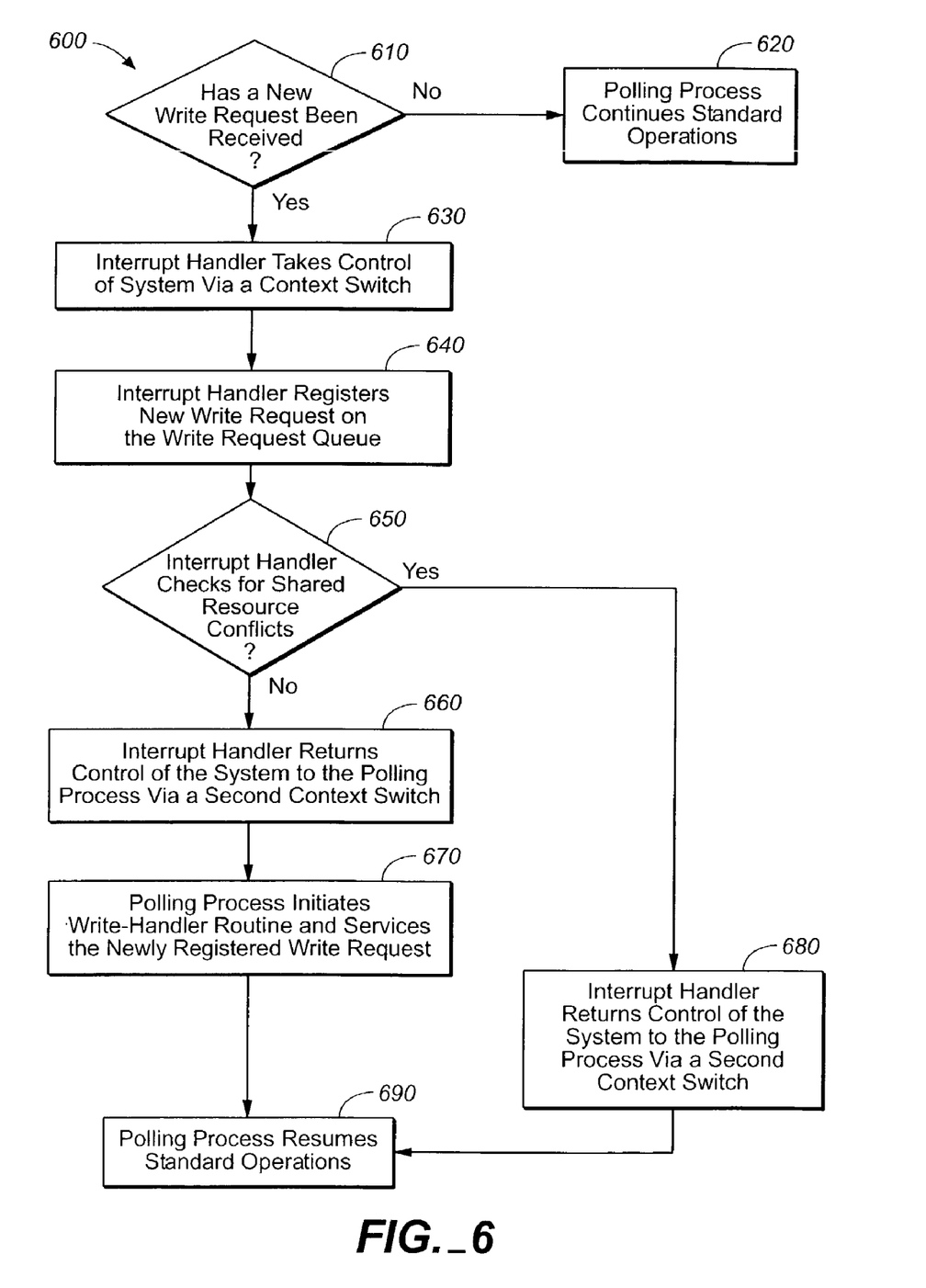
FIG. 6 is an illustration of a third method for servicing of the write requests registered on the write queue by the polling process.

Referring to FIG. 6, a method 600 for servicing write requests by the polling process is shown. Following the same servicing flowchart shown in FIG. 4, method 600 picks up at step 610 where the interrupt handler determines if a new write request is present. If no new write request is present, in step 620, the system continues running its standard polling processes. If a new write request is detected the interrupt handler takes control of the system in step 630 via a context switch and in step 640 the interrupt process registers the write request on the write request queue.

The interrupt process runs a check, in step 650, in order to determine if there are any shared resource conflicts present. The same guide variables (flags and/or semaphores) and method as employed in FIG. 4 are utilized. However, instead of having the interrupt process service the write request(s) after the guide variables indicate there is no mutual exclusion problem, in step 660 the interrupt process returns control to the polling process and in step 670 the polling process services the registered write request(s) right after the guide variables are cleared by initiating a write-handler routine. Following the servicing of the registered write request(s), in step 690 the polling process resumes its standard operations. If, in step 650, the interrupt handler determines that there is a shared resource conflict then the interrupt process, in step 680, returns control of the system to the polling process via the second context switch. After step 680 the polling process, in step 690, resumes standard operations.

Figure 7:
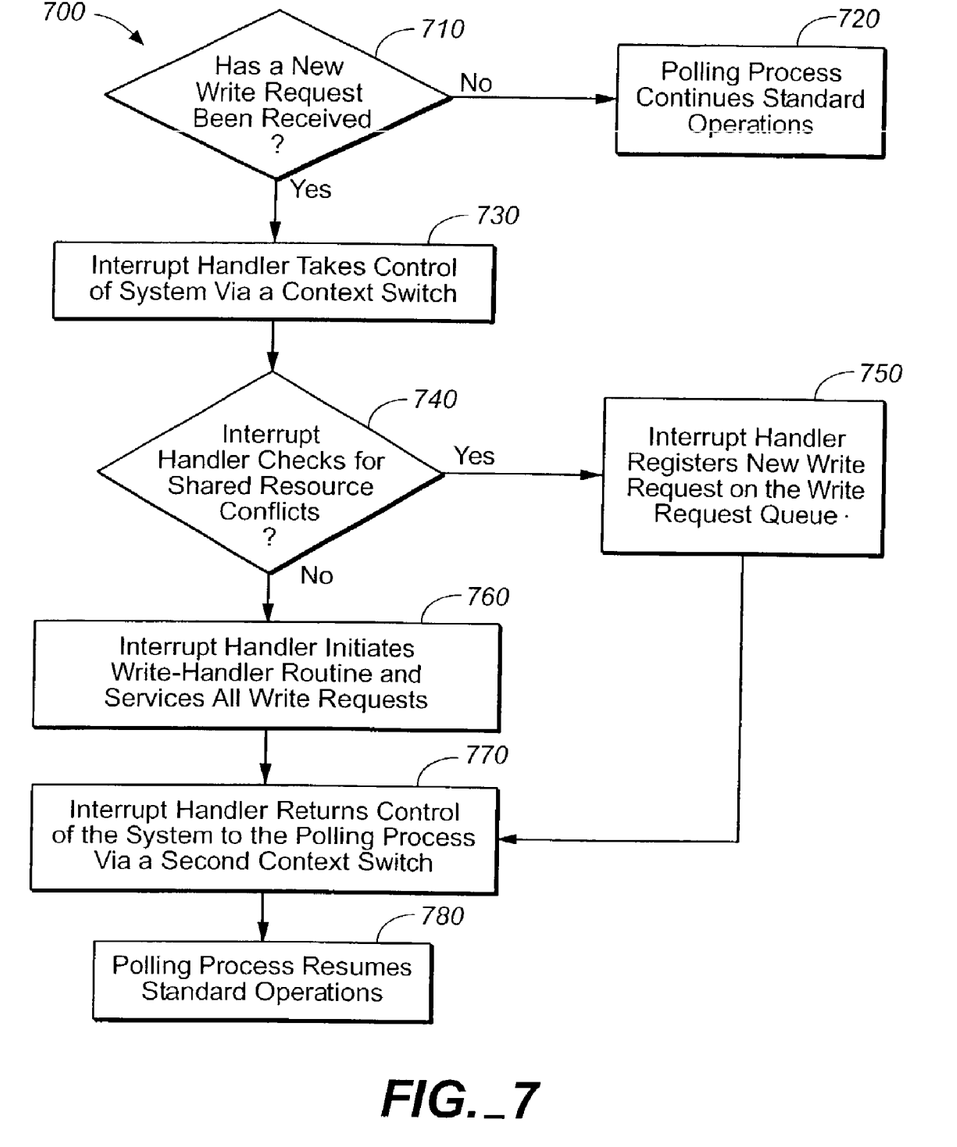
FIG. 7 is an illustration of a fourth method for servicing of the write requests by the interrupt handler process.

Referring to FIG. 7, a method 700 for servicing write requests by the interrupt handler (interrupt process) is shown. Again we follow the same flowchart in FIG. 4 down to step 710 where the interrupt handler determines if a new write request is present. If, in step 710, it is determined that no new write request is present then in step 720 the system continues running the polling processes. The interrupt handler takes control of the system in step 730 via a context switch. However, the interrupt process in this method does not automatically register the write request. Instead, the interrupt process immediately runs a check, in step 740, in order to determine if there are any shared resource conflicts present. If shared resource conflicts are found then in step 750 the interrupt handler registers the new write request on the write request queue. In this situation the servicing of the write request will have to be delayed until the shared resource conflict is cleared. Therefore, following step 750 the interrupt handler returns control of the system to the polling process via the second context switch, in step 770.

Upon determining that there are no mutual exclusion problems, the interrupt process, in step 760, initiates a write-handler routine for the write request. This method circumvents the automatic registering of the write request on the queue if it is a non-conflicting write to the shared resource. The queue is still needed and utilized in the case where the write request is a shared resource conflict. In that case the write request may be registered or another application may be performed upon it. Upon completing the servicing of the write request, the interrupt handler, in step 770, returns control of the system to the polling process via the second context switch. This is followed by the polling process, in step 780, resuming standard operations.

In the exemplary embodiments, the methods disclosed may be implemented as sets of instructions or software readable by a device. Further, it is understood that the specific order or hierarchy of steps in the methods disclosed are examples of exemplary approaches. Based upon design preferences, it is understood that the specific order or hierarchy of steps in the method may be rearranged while remaining within the scope and spirit of the present invention. The accompanying method claims present elements of the various steps in a sample order, and are not necessarily meant to be limited to the specific order or hierarchy presented.

It is believed that the system and method for handling non-maskable interrupts (NMI) in single thread non-mission critical systems with limited memory space of the present invention and many of its attendant advantages will be understood by the forgoing description. It is also believed that it will be apparent that various changes may be made in the form, construction, and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A method for handling write requests within a single thread system, comprising:
   establishing a write request storage location disposed in a single thread system, for storing and providing access to a write request;
   receiving of the write request by an interrupt handler disposed in a single thread system;
   registering of the write request, by the interrupt handler, on the write request storage location disposed in the single thread system; and
   servicing the write requests from the storage location disposed within the single thread system.

2. The method of claim 1, wherein the write request storage location is at least one of a queue and a linked list, for storing the write request.

3. The method of claim 2, wherein the queue includes a start index, an end index, a request count and a service count.

4. The method of claim 3, wherein the queue is a global limited size queue including a total size limiting routine.

5. The method of claim 2, wherein the linked list includes a head node and a tail node.

6. The method of claim 1, wherein the interrupt handler determines whether the maximum capacity of the write request storage location has been reached before registering the write request upon the storage location.

7. The method of claim 1, wherein servicing of the write request is accomplished by at least one of the interrupt handler and a polling process, which initiate a write-handler routine.

8. The method of claim 7, wherein the polling process, before performing its read/write operations, initiates the write-handler routine.

9. The method of claim 7, wherein the interrupt handler, after determining that there are no shared resource access conflicts between variables currently being modified and variables to be modified by the write request, initiates the write-handler routine.

10. The method of claim 7, wherein a context switch is coupled to the interrupt handler, the context switch being capable of giving operation execution priority to the interrupt handler for initiating the write-handler routine.

11. The method of claim 7, wherein the polling process initiates the write-handler routine after determining that there are no shared resource access conflicts between variables currently being modified and variables to be modified by the write request.

12. The method of claim 7, wherein at least one of the interrupt handler and the polling process may re-organize the write requests received so that non-shared resource conflict writes are serviced immediately without being registered in at least one of the queue and the linked list.

13. The method of claim 1, wherein the single thread system is a single thread non-mission critical system.

14. A system for handling a write request in a single thread system, comprising:
   a write request queue disposed in the single thread system, for providing a storage location for and access to the write request; and
   an interrupt handler disposed within the single thread system, for receiving the write request and registering the write request on the write request queue; and
   a polling process disposed in the single thread system, for servicing the write request registered on the write request queue by initiating a write-handler routine,
   wherein the system registers the write request in the write request queue prior to initiating the write-handler routine.

15. The system of claim 14, wherein the write request queue includes a start index, end index, request count and a service count.

16. The system of claim 15, wherein the write request queue is a global limited size queue including a size limiting index.

17. The system of claim 14, wherein the write request queue is a linked list including a head node and a tail node.

18. The system of claim 14, wherein the system further comprises a first and a second context switch coupled to the interrupt handler, the first context switch being capable of giving operational priority to the interrupt handler and the second context switch being capable of returning operational priority to the polling process.

19. The system of claim 18, wherein the interrupt handler registers the write request on the write request queue after the interrupt handler determines there is room on the write request queue.

20. The system of claim 14, wherein the polling process, at the beginning of its routine, initiates the write-handler routine.

21. The system of claim 14, wherein the interrupt handler, after determining that there are no shared resource access conflicts between variables currently being modified and variables to be modified by the write request, initiates the write-handler routine.

22. The system of claim 14 wherein the interrupt handler may re-organize the write requests received so that non-conflicting shared resource writes are serviced immediately without being registered in at least one of the write request queue and the linked list.

23. The system of claim 14 wherein the single thread system is a single thread non-mission critical system with limited memory space.

24. A system for handling write requests in a single thread system, comprising:
- a write request queue disposed in the single thread system, for providing a storage location for and access to the write request;
- an interrupt handler disposed within the single thread system, for receiving write requests, registering the write request on the write request queue and initiating a write-handler routine; and
- a polling process disposed in the single thread system, for servicing the write requests registered on the write request queue by initiating the write-handler routine,
- wherein the system registers the write request in the write request queue prior to initiating the write-handler routine.

25. The system of claim 24, wherein the write request queue includes a start index, end index, request count and a service count.

26. The system of claim 25, wherein the write request queue is a global limited size queue including a size limiting index.

27. The system of claim 24, wherein the write request queue is a linked list including a head node and a tail node.

28. The system of claim 24, wherein the system further comprises a first and a second context switch coupled to the interrupt handler, the first context switch being capable of giving operational priority to the interrupt handler and the second context switch being capable of returning operational priority to the polling process.

29. The system of claim 28, wherein the interrupt handler registers the write request on the write request queue after the interrupt handler determines there is room on the write request queue.

30. The system of claim 24, wherein the interrupt handler, after determining that there are no shared resource access conflicts between variables currently being modified and variables to be modified by the write request, initiates the write-handler routine to service the write request.

31. The system of claim 24, wherein the polling process, before performing its read/write operations, initiates the write-handler routine.

32. The system of claim 24, wherein the interrupt handler may re-organize the write requests received so that non-conflicting shared resource writes are serviced immediately without being registered in at least one of the write request queue and the linked list.

33. The system of claim 24, wherein the single thread system is a single thread non-mission critical system with limited memory space.

* * * * *